A. FULLER.
Tank-Regulator.
No. 164,539. Patented June 15, 1875.
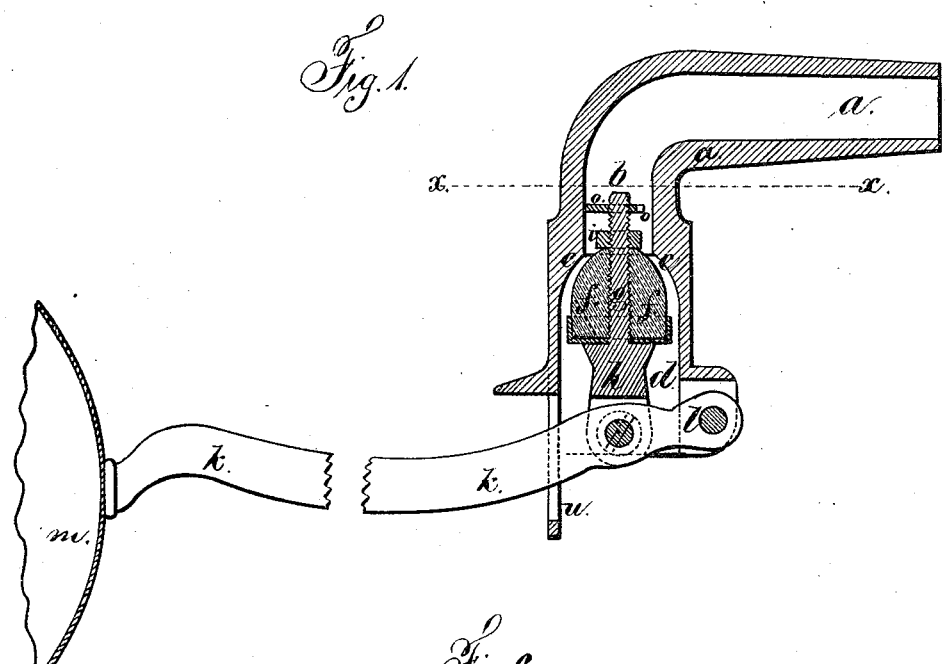
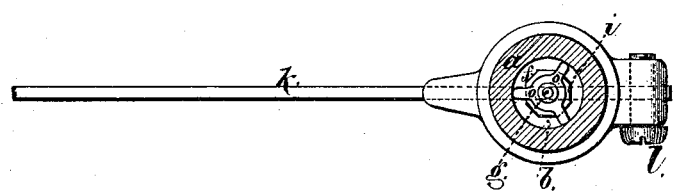

UNITED STATES PATENT OFFICE.

ALBERT FULLER, OF BROOKLYN, NEW YORK.

IMPROVEMENT IN TANK-REGULATORS.

Specification forming part of Letters Patent No. 164,539, dated June 15, 1875; application filed May 17, 1875.

*To all whom it may concern:*

Be it known that I, ALBERT FULLER, of Brooklyn, in the county of Kings and State of New York, have invented an Improvement in Tank-Regulators, of which the following is a specification:

This invention is for regulating the supply of water into tanks and reservoirs, so as to shut off the supply when the water reaches a given height.

A valve has been used for this purpose operated by a ball or float and lever; but in practice these valves are found to be very noisy, especially just before closing. The valve has been applied upon a stem, and the stem has been connected with the float-lever, and as the valve has been pressed toward its seat by the action of the float, the passing water has given to the valve a tremulous motion, causing the valve to thump first against one side of the seat, and then the other, and produce a most disagreeable rapping noise that continues generally until the valve is entirely closed. This is believed to arise from the unequal action of the water when the valve is nearer to the seat on one side than on the other.

To prevent this difficulty, I make use of an india-rubber valve, and a parallel water-way leading to the valve-seat, and upon the valve-stem I place three or more arms, forming guides that slide freely but closely in the parallel portion of the passage; thereby the action of the water is rendered uniform by the arms that divide it; the valve is also steadied, and the valve, being of rubber, closes very tightly when the height of the water in the tank is sufficient to entirely close the valve, and the elasticity of the valve is such that there will not be any sound, even if there should be a slight concussion.

In the drawing, Figure 1 is a vertical section of the tank-regulator, and Fig. 2 is a sectional plan of the same below the line $x\ x$.

The pipe $a$ is connected with the supply water-pipe, and the vertical water-way $b$ forms an L with said pipe $a$, and $c$ is the valve-seat. $d$ is the valve-chamber, below the seat $c$, and in it is the india-rubber conical valve $f$ upon the stem $g$, that is provided with the supporting-base $h$ and clamping-nut $i$. The stem $g$ is jointed at its lower end to the lever $k$, which swings upon the fulcrum $l$, and moves between the guide-bars $n$. At the outer end of this lever $k$ is a float, a portion of which is shown at $m$, and as the water in the tank or reservoir accumulates the float rises and closes the valve $f$ against its seat, and stops the supply. The reverse movement opens the valve as the water in the reservoir descends.

In order to prevent the thumping or fluttering of the valve before named, as the valve closes, I employ the arms $o$, forming guides that are upon the valve-stem $g$, and their outer ends rest against the interior surface of the parallel water-way $b$, whereby the valve is free to move up and down; but any side movement is effectually prevented, so that there is not any noise or concussion in the working of the valve.

I claim as my invention—

The conical rubber valve $f$ with the guide-arms $o$ upon the valve-stem, in combination with the parallel water-way $b$, valve-seat $c$, lever $k$, and float $m$, substantially as set forth.

Signed by me this 12th day of May, 1875.

ALBERT FULLER.

Witnesses:
GEO. T. PINCKNEY,
GEO. D. WALKER.